Oct. 9, 1956

D. M. ZABRISKIE 2,766,097

MAGNETIC STYLUS GUIDE

Filed May 27, 1953

INVENTOR.
D. M. ZABRISKIE

BY M. J. Reynolds
ATTORNEY

United States Patent Office 2,766,097

Patented Oct. 9, 1956

2,766,097

MAGNETIC STYLUS GUIDE

Douglas M. Zabriskie, Northvale, N. J., assignor to The Western Union Telegraph Company, New York, N. Y., a corporation of New York Application May 27, 1953, Serial No. 357,731

11 Claims. (Cl. 346—139)

This invention relates to an improved device for retaining and guiding the stylus of a facsimile machine in its path across the message paper.

Facsimile devices of the more common kind employ a rapidly rotating paper covered drum, upon which the marking stylus presses as it is drawn slowly across the surface of the paper. Under these circumstances, the requirements of stylus guiding are adequately met by the use of a lead screw or a rack and pinion for imparting motion to the stylus carrier in its single slow passage along the drum and by the use of a wheeled or sliding stylus carrier moving on guiding rails. A more recently developed principle of facsimile recorder operation is the belt type scanner which utilizes plural styluses fastened to a belt of spring steel which is stretched over a pair of pulleys and is rotated at relatively high speed by a motor. The record paper is then advanced slowly beneath these contacting styluses to produce continuous coverage of the paper by the successive rapid passage of the styluses thereacross. This latter method of operation is shown and described in application Ser. No. 279,261 of D. M. Zabriskie copending herewith, and in particular in Figs. 10–20 thereof.

Methods of stylus guiding which have been used in facsimile machines of this type have included tightly stretched wires, smooth metal bars, and the tension in a stylus carrying driving belt of flexible spring steel.

In this latter case, support provided by the stretched belt is deficient in cases where the message paper is of considerable width unless values of belt tension are employed which are impractically large. A flat leaf of spring steel is therefore located above the moving belt in this case to force the stylus holder sliding beneath it into intimate contact with a guiding rail. Similar disadvantages apply to the use of stretched wires with the further drawback that some auxiliary means of support, such as a wheeled or sliding carriage engaging an additional supporting bar is then required. Such a carriage is expensive to manufacture and since it constitutes a relatively large object repeatedly crossing the field of view while in operation, it makes an examination of the record material more difficult because of its distracting influence. All facsimile recorders require that each record be examined during the recording if it is desired to eliminate the possibility of malfunctioning of the equipment. This is especially desirable in the case of recorders for reproducing on wide sheets of message paper such as map and chart recorders, for which use the present invention is well adapted.

In the case of stylus guiding by means of a smooth metal bar, as previously constructed, a similar bulky carriage or other auxiliary equipment also has been required.

An object of this invention is to overcome these difficulties by means of a stylus control device having only a small moving part in the field of view, but providing uniform rigid stylus support for any width of message sheet.

It is also an object of the present invention to provide an arrangement for stylus positioning control which can be manufactured easily to have predetermined characteristics of position and friction.

A further object of the invention is to provide such a structure requiring no adjustment upon installation or in use in order to secure accurate tracking of the stylus holders.

Another object of the invention is to provide a stylus guiding assembly whereby the linearity of stylus travel is not adversely affected by minor irregularities in the belt.

Further objects and advantages of the invention will be evident upon consideration of the following detailed description of an illustrative example thereof, taken in conjunction with the accompanying drawings, in which.

Figure 1:
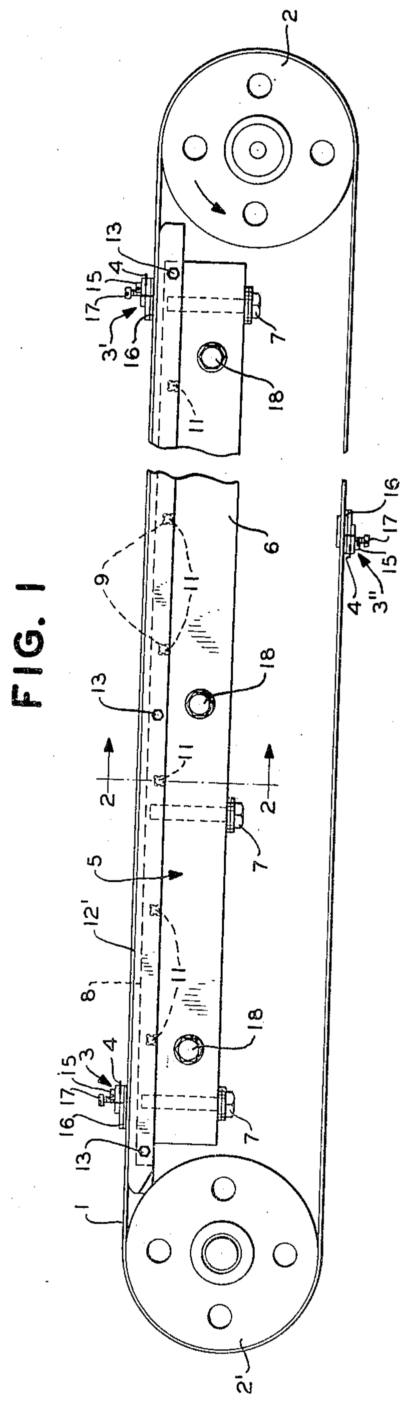
Fig. 1 is a plan view of a belt and stylus assembly provided with the magnetic stylus guide of the present invention.

Referring now to Fig. 1, it is seen that an endless belt 1 made of spring steel is stretched over drive pulley 2′ and tension pulley 2 and thereby rotated in the direction indicated by the arrow on drive pulley 2. Stylus carriers 3, 3′ and 3″ are secured to the belt and travel with it in its revolution about the pulleys 2 and 2′. They are constructed of a ferro-magnetic material such, for example, as cold rolled steel in a manner to be explained later. Each said stylus holder is provided with a protruding stylus having a relatively sharp writing point at its end, as seen more clearly at 4 in Fig. 2, and the pulleys 2 and 2′ are so located and affixed with respect to a facsimile recording machine which is not shown in the drawings, that the path of stylus travel during the upper transit of said belt traverses a sheet of record paper held in said recording machine. The writing point of the stylus is thus engaged with the record paper, and to secure the necessary uniform writing pressure thereof against the paper as well as to insure linearity of stylus travel, it is necessary that a stylus guiding device, such as 5, comprising the present invention, be employed.

Figure 2:
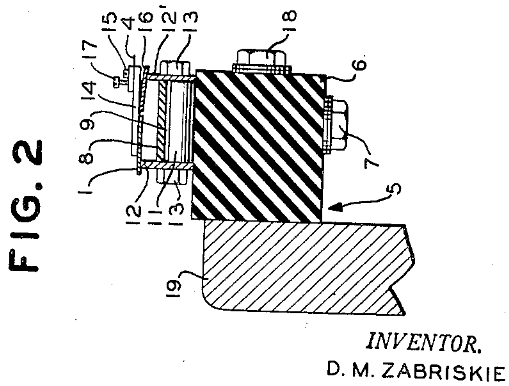
Fig. 2 is a cross-sectional view taken on the line 2—2 of Fig. 1.

A rigid bar 6 of non-magnetic material such as Bakelite is fixedly mounted in relation to the belt and pulleys aforementioned by means of cap screws 18, and is secured to a second bar 8 of similar material by means of cap screws 7, as may also be seen in Fig. 2. Bar 8 of non-magnetic material is constructed with transverse rabbets 9 of square section milled in its lower surface, into which are inserted cylindrical permanent magnets 11 of a suitable magnetic material having high remanence. When constructed of a cast alloy containing cobalt, nickel and iron, these bar magnets may be of one-quarter inch diameter placed at two inch intervals and oriented in the same magnetic direction. Rails 12 and 12′ as seen in Fig. 2 are strips of steel or other magnetic material worked smooth and straight on the upper edge, fastened to opposite sides of bar 8 and held in contact with the ends of magnets 11 by means of through bolts 13. Said bolts may be made of brass or other non-magnetic material to reduce the shunting effect which they would otherwise have on the magnets 11, thus increasing the available pole strength of the assembly for a given size and number of magnets. The said rails are preferably made of a hard and wear-resisting material such as a properly treated hardenable steel, or they may be given a wear-resisting and non-seizing surface by such means as a hard chrome plate, which is the commercial designation of a dense and relatively thick electrodeposit of chromium over suitable preparatory flash deposits of base metal.

In Fig. 2 is shown a cross-section of the belt guiding assembly, in which the belt 1 is supported at its rearward edge by the rail 12 and at the front edge by being welded to stylus holder plate 14. Said plate carries the stylus 4 by means of clamping screw 15, and is welded to a hardened spring steel shoe member 16 which is adjustable as to height by means of screw 17. Since shoe 16 slides in contact with rail 12′, screw 17 constitutes a means of adjusting stylus height. Cap screws 18 secure the assembly to the frame 19 of the machine.

The rails 12 and 12′ act as pole pieces of a single long magnet, and therefore exert an attracting influence on the stylus carrying assembly, rail 12 attracting the belt 1 and the stylus block 14, while rail 12′ attracts the wearplate 16 and the stylus block 14. It is not essential that the belt 1 be attracted by the rails, however, and in the case of a belt made of woven fabric, non-ferrous metal, or other non-magnetic material, the wearplate and the stylus block only need be attracted. By the use of a stylus block made of an appropriate wear resistant material, such as case hardened steel or hardenable steel, the wearplate can be eliminated and the attractive force confined to the stylus block alone.

Figure 3:
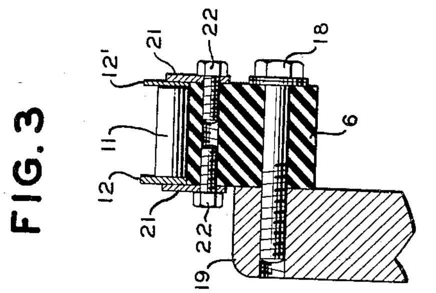
Fig. 3 is an alternative construction of the rail assembly of Fig. 2.

Fig. 3 shows an alternative construction of the guiding mechanism previously described wherein one of said bars is eliminated to provide a simplified structure in which the rails 12 and 12′ are separated only by the magnets 11, which are accurately ground to produce squarely cut ends and uniform length. Clamping members 21 serve to retain the assembly of magnet and rails in position due to the pressure of clamping screws 22.

Figure 4:
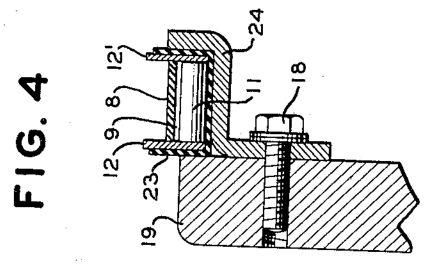
Fig. 4 is an alternative construction of the rail assembly of Fig. 2.

Fig. 4 illustrates a further simplification of said guiding mechanism and comprises a pair of rails 12 and 12′ retained in opposite magnetic polarity by close contact with magnets 11, as previously described. A sheet of compressible gasketing material 23 surrounds the said assembly, and the whole is compressed and retained in position by clamp 24 of non-magnetic material which is retained under pressure by cap screws 18 into frame 19.

Figures 5, 6, 7, 8:
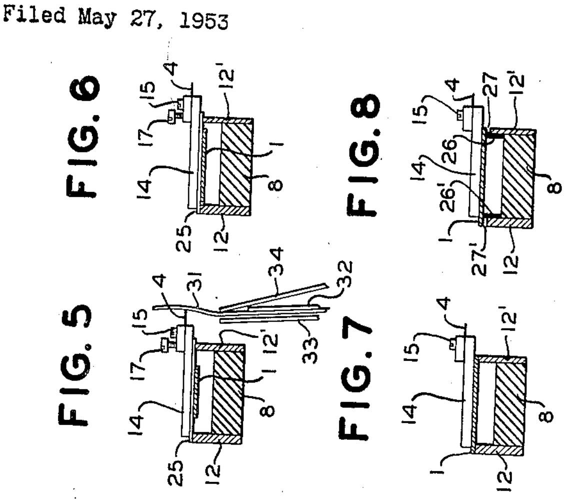
Fig. 5 represents an alternative construction of the belt and stylus assembly of Fig. 2.
Fig. 6 is an alternative construction of Fig. 5.
Fig. 7 is an alternative construction of Fig. 5.
Fig. 8 is an alternative construction of Fig. 5.

Fig. 5 illustrates one example of a detailed arrangement of a spacing bar 8 containing magnets not shown, rails 12 and 12′ in contact therewith and acting as pole pieces, and a flexible belt 1 which is firmly attached to the wearplate 25 made of hardened steel, and to the stylus holder block 14, made of cold rolled steel. The stylus 4 is retained in a groove in said block by means of a screw 15, and the writing point of the stylus is adjustable as to height by means of the screw 17 threaded into the said stylus block and pressing on the said wearplate 25, serving to bend said wearplate downward beneath the adjusting screw at the point of contact therewith.

A portion of a sheet of electrographic recording paper 31 is shown in operating contact with the stylus 4 and the means for guiding it and retaining it in position is shown as the front and rear plates 33 and 32 respectively of a paper supporting platen comprising the said plates and a vane 34, hinged at a remote point not shown on the drawing and spring-pressed against the paper.

Fig. 6 illustrates an example of a preferable arrangement of the parts described in Fig. 5, wherein the flexible metal belt 1 is offset to provide an abutment against the rail 12 in order to prevent retractile motion of the stylus 4 and thus to ensure adequate resistance thereof to writing pressure at all times.

Fig. 7 shows an alternative construction in which the flexible metal belt 1 spans the rails 12 and 12′ to provide a homogeneous armature for the magnet assembly of rails 12 and 12′ and the bar 8, which contains permanent magnets not there shown.

In Fig. 8 is shown an arrangement of components similar to Fig. 7, but having the flexible metal belt 1 removed from contact with the rails 12 and 12′ by the interposition of blocks 26 and 26′ made of a low friction non-magnetic material such as nylon. These said blocks are firmly attached to the stationary portion of the assembly which consists of rails 12 and 12′, bar 8, and its energizing magnetic bars 11 shown in Fig. 1. In this construction the air gaps 27 and 27′ serve to render the force of magnetic attraction more constant by rendering it insensitive to slight vertical displacement of the moving belt 1 and the blocks 26 and 26′ reduce dimensional changes due to wear and provide a low and constant friction drag to the motion of the belt 1.

By means of the invention so described, a number of advantages of a less obvious nature are secured, including an assured uniformity of control of the stylus. The aforementioned flat leaf of spring steel which presses against the stylus holders sliding beneath and against it, in prior constructions, is necessarily flexible, and passage of the stylus holders beneath it produces undulations in its edge, resulting in undesired ripples being worn therein, with consequent degradation of the recording. The present invention overcomes this difficulty by providing for the elimination of the flat leaf spring and utilizing a more uniform downward magnetic force, which also avoids all need of periodic adjustment.

An additional advantage arises, in that by eliminating the said flat leaf spring and all other mechanism located above the belt to control its motion, the belt is rendered readily accessible for rapid removal and replacement. Moreover, the adjustment of stylus length, which must be made at frequent intervals, and the changing of styli, which is periodically necessary, are greatly facilitated by the absence of overlying spring structure.

A further advantage lies in the decreased height of the writing assembly made possible by the present invention, in that the writing zone can be located in closer relationship to the top of the recorder case at the point where the written record emerges, with the result that it emerges more quickly, and can be read more nearly simultaneously with being written.

It will be obvious that various modifications, alterations and elaborations of the illustrative examples shown in the drawings and described herein can be effected without departing from the spirit or the essential attributes of the inventive concept disclosed, and it is therefore intended that only such limitations be placed thereon as are specifically set forth in the appended claims.

What is claimed is:

1. In a facsimile recorder for marking a record sheet by a moving stylus, magnetically attractable stylus driving means comprising an endless flexible belt and a plurality of stylus holders mounted on said belt, belt driving means for said belt, stylus guiding means comprising a plurality of parallel rails, fixedly mounted adjacent to a portion of the path of travel of said belt whereby the said stylus holders are translatable by said belt in a path of travel along said rails, at least two of the said rails being ferromagnetic, a plurality of magnets each having a north pole presented to one of said ferromagnetic rails and each having a south pole presented to another one of said ferromagnetic rails, said stylus holders being held in guided relation to said rails by attractive force of the said magnets transmitted through the said ferromagnetic rails to the said stylus driving means.

2. In a facsimile recorder for marking a record sheet by a moving stylus, magnetically attractable stylus driving means comprising an endless flexible belt and a plurality of stylus holders mounted on said belt, belt driving means for said belt, stylus guiding means comprising a plurality of parallel rails, fixedly mounted adjacent to a portion of the path of travel of said belt whereby the said stylus holders are translatable by said belt in a path of travel along said rails, at least two of the said rails being ferromagnetic, a plurality of permanent magnets each having a north pole presented to one of said ferromagnetic rails and each having a south pole presented to another one of said ferromagnetic rails, said stylus holders being held in guided relation to said rails by attractive force of the said permanent magnet transmitted through the said ferromagnetic rails to the said stylus driving means.

3. In a facsimile recorder for marking a record sheet by a moving stylus, magnetically attractable stylus driving means comprising an endless flexible belt and a plurality of stylus holders mounted on said belt, belt driving means for said belt, stylus guiding means comprising a plurality of parallel rails, fixedly mounted adjacent to a portion of the path of travel of said belt whereby the said stylus holders are translatable by said belt in a linear path of travel along said rails, at least two of the said rails being ferromagnetic, a plurality of permanent magnets each having a north pole presented to one of said ferromagnetic rails and each having a south pole presented to another one of said ferromagnetic rails, said stylus holders being held in guided relation to said rails by attractive force of the said permanent magnets transmitted through the said ferromagnetic rails to the said stylus driving means to effect sliding engagement between the said rails and the said stylus driving means.

4. In a facsimile recorder for marking a record sheet by a moving stylus, magnetically attractable stylus driving means comprising an endless flexible belt and a plurality of stylus holders mounted on said belt, belt driving means for said belt, stylus guiding means comprising a pair of parallel rails, fixedly mounted adjacent to a portion of the path of travel of said belt whereby the said stylus holders are translatable by said belt in a linear path of travel along said rails, said guide rails comprising each a ferromagnetic portion and a wearing surface portion, the said wearing surface portion being chromium, a plurality of permanent magnets each having a north pole presented to one of said rails and each having a south pole presented to another one of said rails, said stylus holders being held in guided relation to said rails by attractive force of the said permanent magnet transmitted through the said rails to the said stylus driving means.

5. In a facsimile recorder for marking a record sheet by a moving stylus, stylus driving means comprising an endless flexible nonmagnetic belt and a plurality of stylus holders of magnetic material mounted on said belt, driving means for said belt, stylus guiding means comprising a pair of parallel rails, fixedly mounted adjacent to a portion of the path of travel of said belt whereby the said stylus holders are translatable by said belt in a linear path of travel along said rails, a plurality of permanent magnets each having a north pole presented to one of said rails and each having a south pole presented to another one of said rails, said stylus holders being held in guided relation to said rails by attractive force of the said permanent magnet transmitted through the said rails to the said driving means.

6. In a facsimile recorder for marking a record sheet by a moving stylus, stylus driving and guiding means comprising driving and idler pulleys, each mounted for rotation in a fixed location, an endless flexible steel belt running over the said pulleys, in engagement therewith and driven thereby, and a plurality of belt mounted stylus holders, a pair of parallel guide rails fixedly mounted adjacent to a portion of said belt running generally parallel thereto, the said guide rails being ferromagnetic, a plurality of permanent magnets each having a north pole secured in contact with one of said ferromagnetic rails, and each having a south pole secured in contact with a different one of said ferromagnetic rails, the said stylus holders being translatable by a driving pulley urged motion of the said belt, in a straight path of sliding travel along said guide rails, and being held in guided relation thereto by attractive force of the said permanent magnets transmitted through the said ferromagnetic guide rails to the said steel belt.

7. In a facsimile recorder for marking a record sheet by a moving stylus, stylus driving and guiding means comprising driving and idler pulleys, each mounted for rotation in a fixed location, an endless flexible steel belt running over the said pulleys in engagement therewith and driven thereby, a pair of parallel guide rails fixedly mounted adjacent to a portion of said belt and parallel thereto, a plurality of permanent magnets each having a north pole secured in contact with one of said rails, and each having a south pole secured in contact with a different one of said rails, resilient rail retaining electrical insulating means surrounding a portion of said rails for uniform rail clamping pressure and a unitary clamping bar engaged therewith, stylus holders on the said belt translatable by a driving pulley urged motion of the said belt in a straight path of sliding travel along said guide rails, and being held in guided relation thereto by attractive force of the said permanent magnets transmitted through the said guide rails to the said stylus holders.

8. In a facsimile recorder for marking a record sheet by a moving stylus, stylus driving and guiding means comprising driving and idler pulleys, each mounted for rotation in a fixed location, an endless flexible steel belt running over the said pulleys in engagement therewith and driven thereby, and a plurality of belt mounted stylus holders, the said stylus driving and guiding means comprising a pair of parallel guide rails fixedly mounted adjacent to a portion of said belt running generally parallel thereto, the said guide rails being ferromagnetic, a plurality of permanent magnets each having a north pole secured in contact with one of said ferromagnetic rails, and each having a south pole secured in contact with a different one of said ferromagnetic rails, the said stylus holders being translatable by a driving pulley urged motion of the said belt in a straight path of sliding travel along said guide rails, and being held in guided, overlapping contact therewith by attractive force of the said permanent magnets transmitted through the said ferromagnetic guide rails to the said stylus holders.

9. In a facsimile recorder for marking a record sheet by a moving stylus, stylus driving and guiding means comprising driving and idler pulleys, each mounted for rotation in a fixed location, an endless flexible steel belt running over the said pulleys, in engagement therewith and driven thereby, and a plurality of belt mounted stylus holders, a pair of parallel guide rails fixedly mounted adjacent to a portion of said belt and parallel thereto, the said guide rails being ferromagnetic, a plurality of permanent magnets each having a north pole secured in contact with one of said rails, and each having a south pole secured in contact with a different one of said rails, the said stylus holders being translatable by a driving pulley urged motion of the said belt, in a straight path of sliding travel in overlapping contact with said guide rails, and being held in guided relation thereto by attractive force of the said permanent magnets transmitted through the said guide rails to the said belt and said stylus holders, and by sliding contact of one edge of the said belt on a side of one of the said guide rails.

10. In a facsimile recorder for marking a record sheet by a moving stylus, stylus driving and guiding means comprising driving and idler pulleys, each mounted for rotation in a fixed location, an endless flexible spring steel belt running over the said pulleys, in engagement therewith and driven thereby, and a plurality of belt mounted stylus holders, a pair of parallel guide rails fixedly mounted adjacent to a portion of said belt and parallel thereto, the said guide rails being ferromagnetic, a plurality of permanent magnets each having a north pole secured in contact with one of said ferromagnetic rails, and each having a south pole secured in contact with a different one of said ferromagnetic rails, the said steel belt being in overlapping sliding contact with the said rails, the said stylus holders being translatable by a driving pulley urged motion of the said inextensible belt, in a straight path of sliding travel along said guide rails, and being held in guided relation thereby by attractive force of the said permanent magnets transmitted through the said ferromagnetic guide rails to the said steel belt and said stylus holders.

11. In a facsimile recorder for marking a record sheet by a moving stylus, stylus driving and guiding means comprising in stylus driving part at least one each of power operated driving and of idler pulleys, each mounted for rotation in a fixed location, an endless flexible belt of inextensible construction running over the said pulleys, in engagement therewith and driven thereby, and a plurality of belt mounted stylus holders, the said stylus driving and guiding means comprising in stylus guiding part a first pair and a second pair of parallel guide rails fixedly mounted adjacent to a portion of said belt running generally parallel thereto, said first pair of guide rails being ferromagnetic, a plurality of permanent magnets each having a north pole secured in contact with one of said ferromagnetic rails, and each having a south pole secured in contact with a different one of said ferromagnetic rails, the said stylus holders being translatable by a driving pulley urged motion of the said flexible belt, in a path of sliding travel along said second pair of guide rails, said second pair of guide rails comprising non-metallic sliding surfaces of plastic material having a low co-efficient of friction and being held in guiding relation to the said stylus holders by attractive force of the said permanent magnets transmitted through the said ferromagnetic guide rails to the said driving part, and holding the said driving part in sliding contact with the said second pair of guide rails and out of contact with the said first pair of guide rails.

References Cited in the file of this patent

UNITED STATES PATENTS

| | | |
|---|---|---|
| 2,079,241 | Burt | May 4, 1937 |
| 2,393,300 | Denton | Jan. 22, 1946 |
| 2,565,624 | Phelon | Aug. 28, 1951 |
| 2,565,625 | Phelon | Aug. 28, 1951 |
| 2,591,138 | Cooley | Apr. 1, 1952 |
| 2,639,211 | Hallden et al. | May 19, 1953 |
| 2,643,174 | Cooley | June 23, 1953 |
| 2,661,092 | Injeski | Dec. 1, 1953 |